(No Model.) 2 Sheets—Sheet 1.
P. A. SPICER.
SELF BINDING GRAIN HARVESTER.
No. 332,565. Patented Dec. 15, 1885.
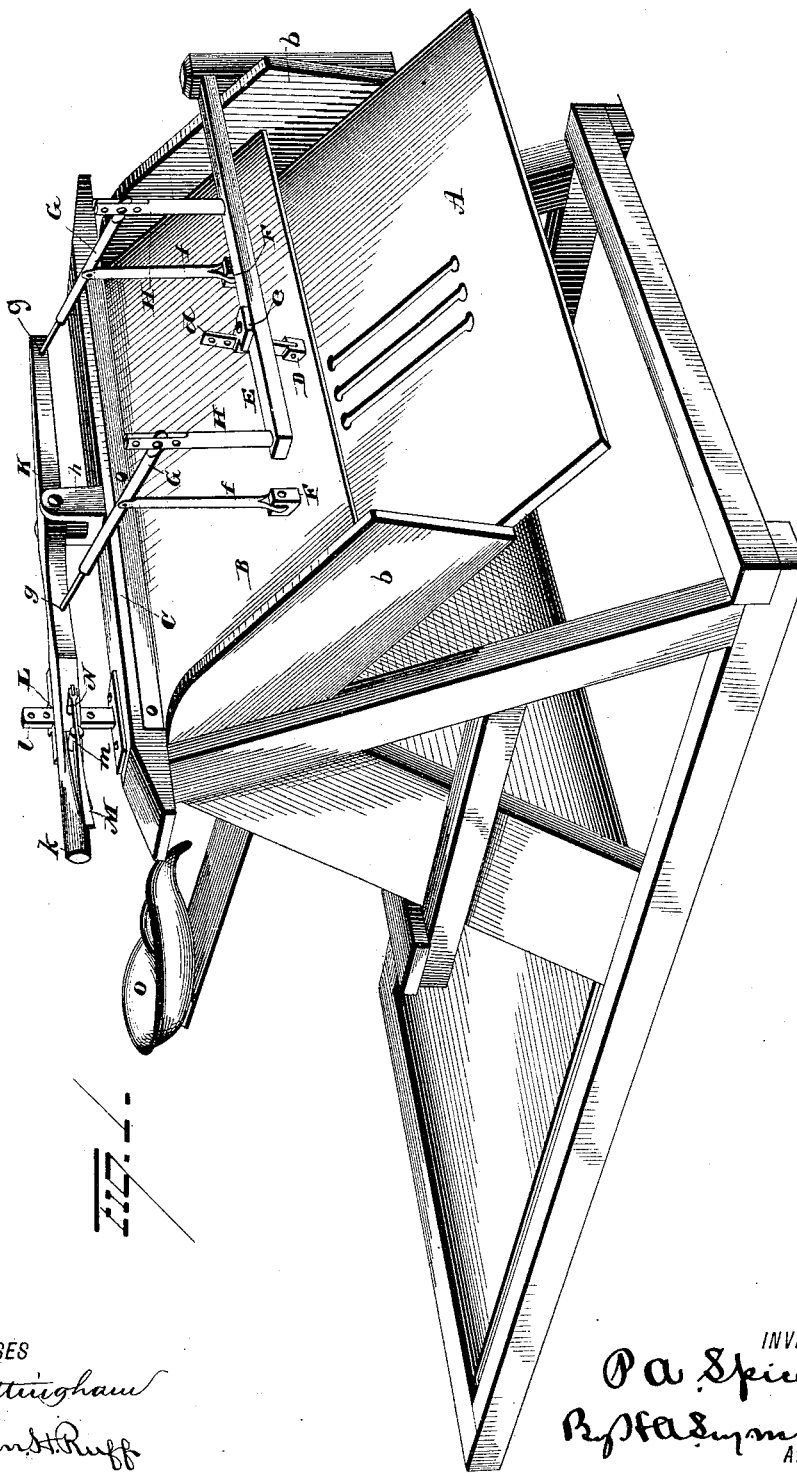
WITNESSES
E. Nottingham
William H. Ruff
INVENTOR
P. A. Spicer.
By H. A. Symons
Attorney

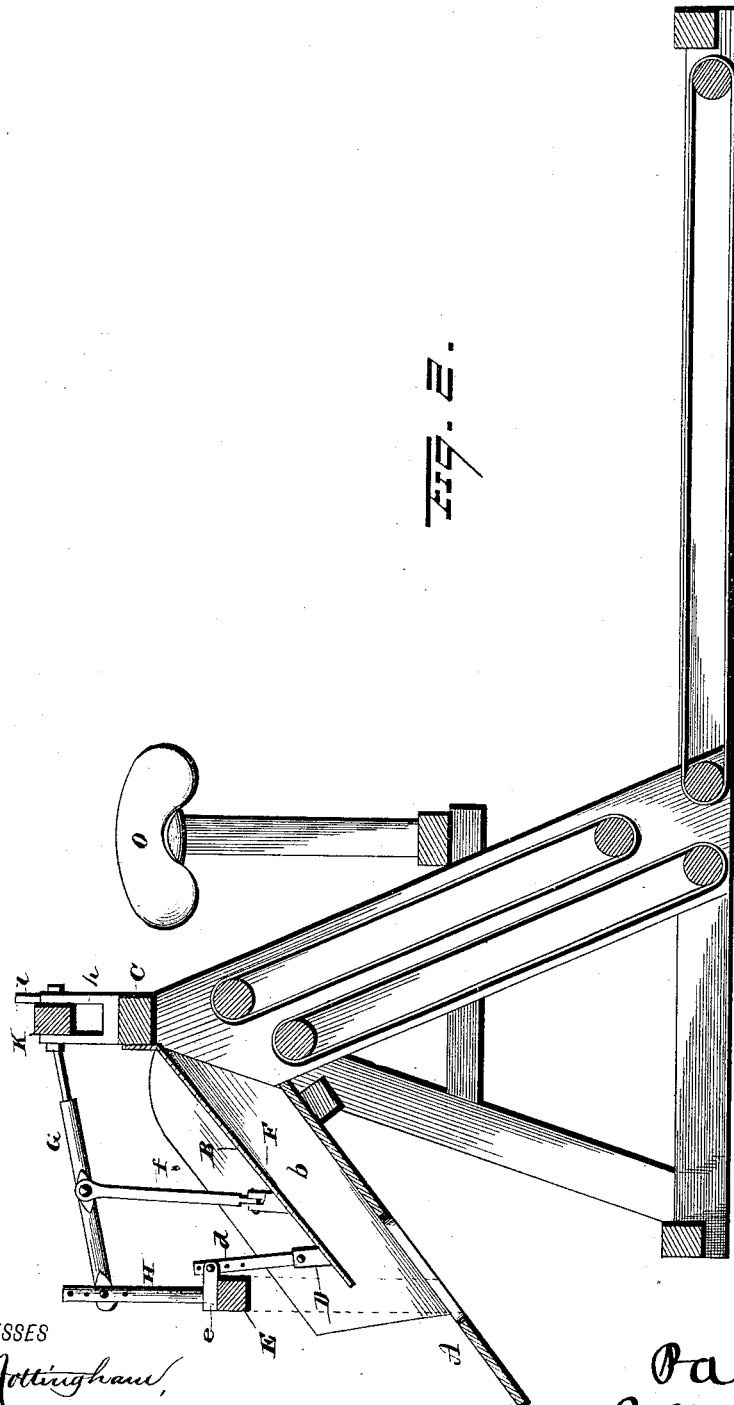

UNITED STATES PATENT OFFICE.

PRATT A. SPICER, OF MARSHALL, MICHIGAN.

SELF-BINDING GRAIN-HARVESTER.

SPECIFICATION forming part of Letters Patent No. 332,565, dated December 15, 1885.

Application filed February 19, 1884. Serial No. 121,235. (No model.)

*To all whom it may concern:*

Be it known that I, PRATT A. SPICER, of Marshall, in the county of Calhoun and State of Michigan, have invented certain new and useful Improvements in Self-Binding Grain-Harvesters; and I do hereby declare the following to be a full, clear, and exact description of the invention, such as will enable others skilled in the art to which it appertains to make and use the same.

My invention relates to an improvement in self-binding harvesters. It is customary to construct self-binding harvesters in such a manner that when used to cut grain of medium length standing straight up on level ground the grain will be delivered to the binding mechanism in a position to be properly bound. The majority of grain to be cut does not conform to the above-named conditions. The ground is more or less hilly and uneven, and of different degrees of fertility. The rain-fall varies with different seasons, and many other things often unite to render the crop to be harvested anything but favorable. When a binder moves on an upgrade, the grain tends to work back on the binding-table, and is bound too near the butts. When the binder moves on a downgrade, the grain tends to work forward on the binding-table, and is bound too near the tops. When the soil is fertile, the grain grows to greater height than on the poorer soil, and when very fertile the straw is apt to be weak, and liable to be blown or rained down to such an extent as to make the harvesting of it an unpleasant and slovenly job.

The object of my present invention is to provide an easy passage for the cut grain to travel in the direction where it is wanted to be properly bound.

With this end in view my invention consists in devices for elevating and depressing the ends of a flap or throat-piece independently of each other or combinedly and with opposite effect upon the respective ends, and for locking the ends in the required vertical adjustment.

My invention further consists in certain features of construction and combinations of parts, as will be fully described, and pointed out in the claims.

In the accompanying drawings, Figure 1 is a view in perspective of a portion of a binder embodying my invention, and Fig. 2 is a transverse sectional view.

A represents a binding-table of any approved construction. A thin sheet, B, constructed of iron or ribs of wire or steel or any other suitable material, has its upper edge rigidly secured to a cross-bar, C, the latter being secured transversely across and a convenient distance above the binding-table. The sheet or flap B extends from the cross-bar C, over the binding-table and nearly parallel therewith, to a position near the compressors and needle, and serves, in connection with the binding-table and side guides, $b$, to form a throat through which the grain must pass from the reaper to the binder. Near or at the lower or outer edge of the sheet B, and in a position about midway between the ends of the sheet, an upwardly-extending stud, D, is rigidly secured. A bar, $d$, provided with a series of perforations, is pivoted to the stud D, and extends upward between the arms of a bifurcated bracket, $e$, secured to a rigid supporting-bar, E. The arms of the bracket $e$ are perforated to receive a pin, by which the perforated bar $d$, and hence the entire lower edge of the sheet B, may be locked in any required vertical adjustment. The sheet B is further provided with the upwardly-extending studs F, situated in corresponding positions near the ends of the sheet. To the studs F the standards or rods $f$ are pivoted, said standards terminating in bifurcated upper ends, between the arms of which operating rods or bars G are pivoted. The outer ends of the rods G are pivoted to the upper ends of standards H, the latter being rigidly secured to the supporting-bar E. The inner ends of the rods G pass into or through perforations $g$ in an operating-lever, K, in which perforations the said rods are allowed a sliding motion. The lever K is pivoted to an upwardly-extending stud, $h$, secured to the cross-bar C, and terminates rearwardly in a handle, $k$. The lever K is provided with a vertical slot, L, near the handle, which slot is constructed to receive an upwardly-extending bar, $l$, the latter being rigidly secured to the cross-bar C, and provided with a series of perforations.

To a stud, $m$, secured to the outside of the lever K, near its handle $k$, a spring-pressed lever, M, is pivoted. A pin, N, sliding in a transverse perforation in the lever K, and adapted to engage the perforations in the bar l, is pivoted to the forward end of the lever M. The rear end of the lever M is situated conveniently to be grasped by the hand of the operator simultaneously with the handle of the lever K. The driver's seat O is within convenient reach of the handle k of the lever K. From the construction thus fully set forth it will be seen that by raising the handle k of the lever K the forward end of the lower edge of the sheet B will be depressed and the rear end elevated, and when the handle is lowered the forward end of the sheet will be elevated and rear end depressed, while the pin N, pivoted to the end of the spring-pressed lever M, will lock the lever K, and hence the sheet B, in any required adjustment. By these simple devices the operator of the machine is enabled to apply the principle upon which my invention is based with great precision and at a moment's notice. Thus, for example, if the operator is running the machine on a down-grade, and observes a tendency in the cut grain to work too far forward before reaching the compressors, he raises the handle of the lever K, thus contracting the forward portion of the throat, and opening or separating the rear portion. The grain, passing more readily where there is the least resistance, will now gradually work rearwardly before reaching the binder, and be received in the proper position. If, on the other hand, the machine is running on an upgrade, and the grain tending to work too far to the rear, the operator lowers the lever K, and thus produces the opposite effect from that just described.

I believe that I have fully accomplished in this simple, durable, and inexpensive attachment what the complicated and expensive shifting arrangements, side wings, butters, &c., have failed to accomplish. I find, however, that the particular devices herein described for holding the lower or outer edge of the sheet B in the required vertical adjustment, and for adjusting the ends of the said sheet, are preferable, as far as my experience has thus far enabled me to judge; but I do not wish to limit myself to these or any other particular devices for these purposes, nor do I wish to restrict myself to any particular shape or construction for the flap or sheet B, but reserve the privilege of making such changes as fairly fall within the spirit and scope of my invention.

Having fully described my invention, what I claim as new, and desire to secure by Letters Patent, is—

1. In a self-binding harvester, the combination, with a table or way over which the grain passes to the binding mechanism, of a flap secured at one edge to the harvester-frame, and covering the whole or a portion of said table or way and forming a throat, and devices located within easy reach of the driver and indirectly connected to the other or outer edge of the flap, whereby the front and rear ends of said outer edge can be adjusted relatively to the table or way, substantially as set forth.

2. In a self-binding harvester, the combination, with a table or way over which the grain moves on its passage to the binding mechanism, of a flap connected at one edge to the harvester and covering a portion of said table or way, and a single lever for elevating and lowering the front and rear ends of the other edge of said plate, substantially as set forth.

3. In a self-binding harvester, the combination, with a table or way over which the grain passes, of a flap secured at one edge to the harvester, and forming, with the table or way, a throat, and devices for adjusting the outer edge and both ends of said flap or plate, substantially as set forth.

4. In a self-binding harvester, the combination, with a binding-table and a single flap located over the table and secured at its upper or inner end to the harvester-frame, of a lever indirectly connected with the front and rear ends of the outer or lower edge of said flap, substantially as set forth.

5. In a self-binding harvester, the combination, with a single flap or sheet situated above and nearly parallel with the binding-table, and forming, with the binding-table, a throat, of devices for locking the lower or outer edge of the flap in any required vertical adjustment, and devices for adjusting and locking the front and rear ends of the flap in different vertical positions, substantially as set forth.

6. The combination, in a self-binding harvester, of an adjustable throat consisting of a flap or sheet forming, in connection with the floor of the binding-table, a throat, adjusting devices consisting of a perforated bar pivoted to the flap near the middle of its outer edge and passing between the arms of a bracket secured to a supporting-bar, two operating-rods connected with the ends of the flap and with an operating-lever, and a spring-actuated pin constructed to engage a perforated sector-bar, and thereby hold the operating-lever in the required adjustment, substantially as set forth.

7. In a self-binding harvester, an expanding and contracting throat consisting of the binding-table A, in connection with the flap B, and adjusting and operating mechanism, consisting, essentially, of the perforated bar d, secured to the flap B, the locking-bracket e, the operating-rods G, connecting-rods f, the operating-lever K, provided with the spring-pressed lever M and pin N, and bar l, the whole being constructed in the manner and for the purpose substantially as set forth.

In testimony whereof I have signed this specification in the presence of two subscribing witnesses.

PRATT A. SPICER.

Witnesses:
GEO. S. WRIGHT,
NORRIS J. FRINK.